UNITED STATES PATENT OFFICE.

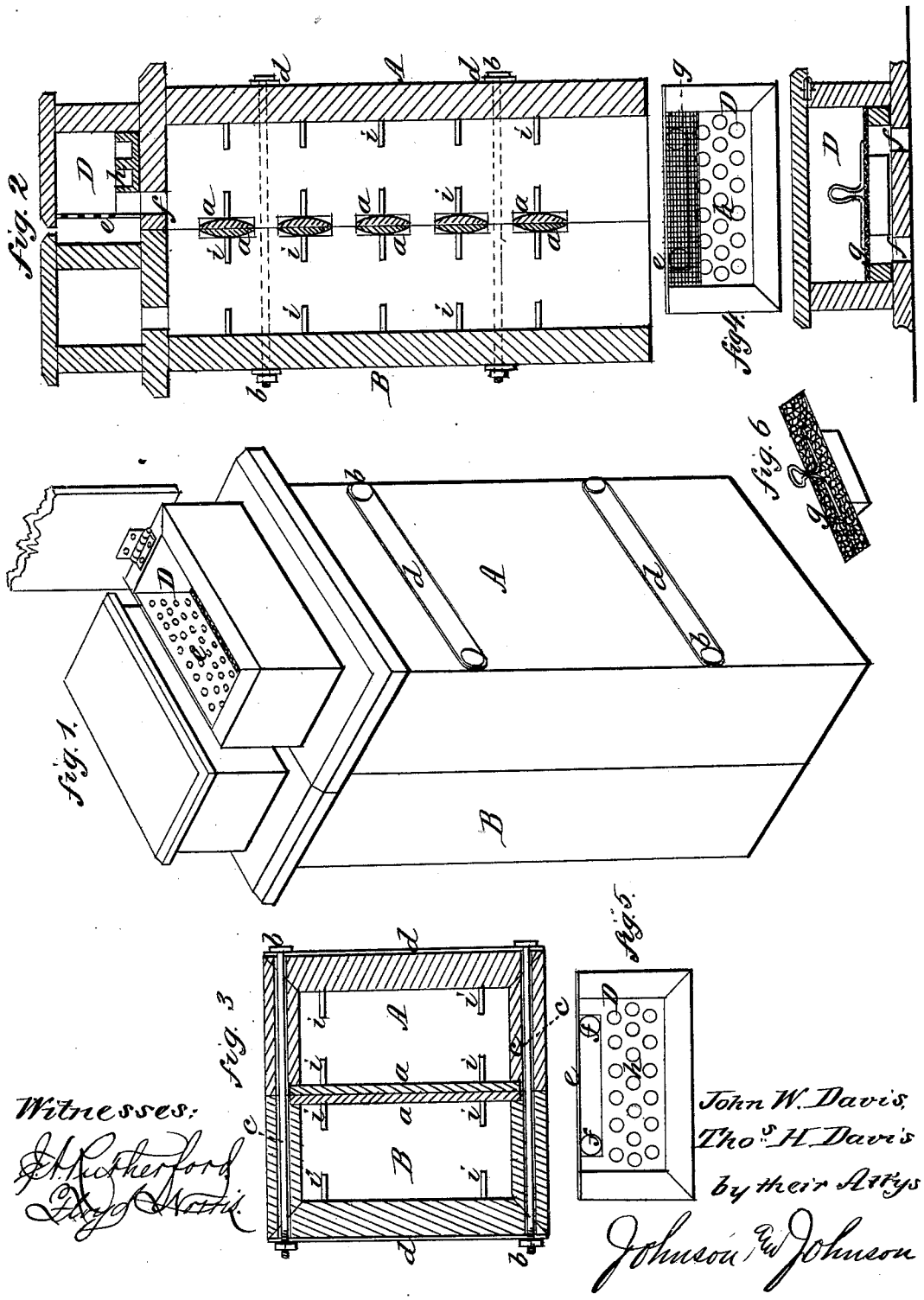

JOHN W. DAVIS, OF HIGHLAND TOWNSHIP, MUSKINGUM COUNTY, AND THOMAS H. DAVIS, OF OTSEGO, OHIO.

IMPROVEMENT IN BEE-HIVES.

Specification forming part of Letters Patent No. 183,650, dated October 24, 1876; application filed September 21, 1876.

*To all whom it may concern:*

Be it known that we, JOHN W. DAVIS, of Highland township, and THOMAS H. DAVIS, of Otsego, both in the county of Muskingum and State of Ohio, have invented certain new and useful Improvements in Bee-Hives, of which the following is a specification, reference being had to the accompanying drawings, in which—

Figure 1 is a view, in perspective, of a hive embracing our invention. Fig. 2 is a vertical section; Fig. 3, a horizontal section taken at right angles to Fig. 2; Fig. 4, a top view and section of the feed-box-ventilating device; Fig. 5, a top view, showing the same as adapted solely for a feed-box; and Fig. 6, detail of the wire cover device.

An ordinary bee-hive—such, for instance, as is shown in the drawings—is divided vertically into two parts, A and B, which closely join each other, each part at the division having longitudinal sections of transverse convex slats *a a*, which, meeting each other, form a succession of integral slats, separating the hive work-chamber into two compartments. These slats *a* are mortised in the walls of the hive, and are of a length and thickness to suit the size of the hive, and are a sufficient distance apart to prevent the comb in the two parts from connecting together by too great joints, since, if the spaces between the slats were too large, the comb in one compartment would be combined and united with the comb of the other at the time of separating the compartments. The two divisions or sections A and B, which together form the hive, are united by bolts *b*, passing through continuous borings *c*, Fig. 3, in the short sides of each division, said borings being of slightly greater diameter than the bolts, so that they may be easily drawn out without jarring or concussion when the hive is to be divided. Bars *d*, of hoop-iron, extend along the outer walls from bolt to bolt, and are pierced by said bolts. They serve the double purpose of washers and braces to prevent the warping and springing of the sectional hive. These bolts have threaded ends and screw-nuts, by which the hive may be tightened, so as to leave no interstice, however small, in which moths can deposit their eggs.

At the top of the hive, and similar in shape to the honey-box, is a feeding-chamber, D, which, when not in use as such, serves as a ventilator. The ventilating device is a perforated sheet of tin, *e*, which forms that side of the feed-chamber adjacent to the honey-box, and in this position is protected from cold blasts of wind. In the bottom of the box D, as in the honey-cap box, there are holes *f* in each corner for the bees, which, of course, also admit air. Used as a ventilator only, these holes are covered by a device, *g*, made of wire-cloth, which is removed when the box is used for feeding. When not used for feeding, the box D can be partially filled with thin shavings, to absorb the moisture and exhalations from the bees.

For the feeding of the bees, we provide a removable platter of cells, *h*, cut out so as not to interfere with the holes, to receive the sugar and water, or whatever preferred food is given the bees at certain times when they require feeding, the box D having a hinged cover for that purpose.

The pegs *i i*, which project from the inner walls of the hive and the slats, are for the purpose of holding the comb in, or transferring comb from other hives.

The main objects of our invention are to permit the bees to remain in the hive as long as desired, and to prevent overcrowding and overswarming, and this is accomplished by a construction of hive so simple that any person of intelligence can make one.

The ordinary hive can be altered to embrace our invention by sawing it through from top to bottom, and inserting slats, adding feed-box, &c.

In our hive the bees multiply more rapidly and save more honey, as there is not so much consumed in promoting warmth as when swarming is encouraged and new swarms put in new boxes.

Bees generally swarm in May, June, and July; but frequently, in consequence of unfavorable weather during these months, they fail to swarm, and should they swarm later in the season they will not collect sufficient honey for sustenance during the winter. By our invention the hives can be divided at will, thereby preventing this failure. We prevent the bees from overswarming during the swarming-fever. The bees will not voluntarily leave this hive, since they have brood and honey at all times, and during bad weather they will have a stock of honey sufficient to keep them from starvation. Should there be a weak hive, all the bees can be driven out of it and out of a strong hive, and each hive given an equal share of strong and weak bees, and an equal amount of honey to each. In this way the bees will go actively to work and drive out moth, which the weak bees cannot do. In this hive the bees are never lost by swarming in the absence of the bee-keeper, as swarming can be prevented. The condition of the bees, comb, and honey can be easily seen at any time, and any defect remedied.

Should bees stop breeding, a cell containing a queen can be inserted by taking out a sufficient amount of comb to admit the queen-cell with a small amount of comb to it.

The hive may be square, round, or oval.

We claim—

1. A bee-hive of joined sections A and B, adapted for vertical division and separation upon the bisection of the transverse slats $a$, as and for the purpose stated.

2. The combination, in a bee-hive having sections A and B, adapted for division and separation vertically, of the horizontal sectional slats $a$, which, when the sections are joined, form a succession of slats, as and for the purpose described.

3. The combination, in a bee-hive having sections A and B, adapted for division and separation vertically, of the transverse slats $a$ and wall and slat pegs $i$, as and for the purpose described.

4. The cellular food-platter $h$, arranged within the top box D, and combined with the openings $f$ in work-chamber, for the purpose specified.

5. The cellular food-platter $h$ and the removable wire-cloth cover $g$, adapted for use within the top box D, and in connection with the openings $f$ of the work-chamber, for the purpose specified.

In testimony whereof we have affixed our signatures in the presence of two witnesses.

JOHN W. DAVIS.
THOMAS H. DAVIS.

Witnesses:
DECATUR BUKER,
AMANDA WILSON.